United States Patent [19]
Buchholz et al.

[11] 3,725,912
[45] Apr. 3, 1973

[54] RADAR VIDEO RECORDING SYSTEM

[75] Inventors: Donald E. Buchholz, Silver Spring; Ronald L. Bakala, Laurel; Robert E. Miller, Ellicott; Richard W. Pickering, Burtonsville, all of Md.

[73] Assignee: The United States of America as represented by the Secretary of the Navy

[22] Filed: May 17, 1971

[21] Appl. No.: 144,103

[52] U.S. Cl..................................343/5 PC, 35/10.4
[51] Int. Cl..................................................G01s 7/02
[58] Field of Search..............343/5 R, 5 PC; 35/10. 4

[56] References Cited

UNITED STATES PATENTS

| | | | |
|---|---|---|---|
| 3,444,553 | 5/1969 | Tsumura et al. | 343/5 PC |
| 3,588,896 | 6/1971 | Duarte | 343/5 PC |
| 3,634,887 | 1/1972 | Buchholz et al. | 343/5 PC |
| 3,662,388 | 5/1972 | Mott et al. | 343/5 PC X |

*Primary Examiner*—T. H. Tubbesing
*Attorney*—R. S. Sciascia, J. A. Cooke and R. J. Erickson

[57] ABSTRACT

A radar data system for recording and replaying radar information for energizing a search radar display unit and having a capability of accommodating a plurality of search radars of either the two-dimensional or three dimensional type. In addition, provision has been made to allow for the variety of signals used to define the search radar position and also for internal fault detection. Also, the system can record and provide command and control signals for external simulators and/or computer systems to perform a wide variety of functions which may be related to the recorded search radar presentations. The system is divided into two primary sections, record and reproduce, and is further subdivided according to the type of data being recorded on a recorder track.

15 Claims, 15 Drawing Figures

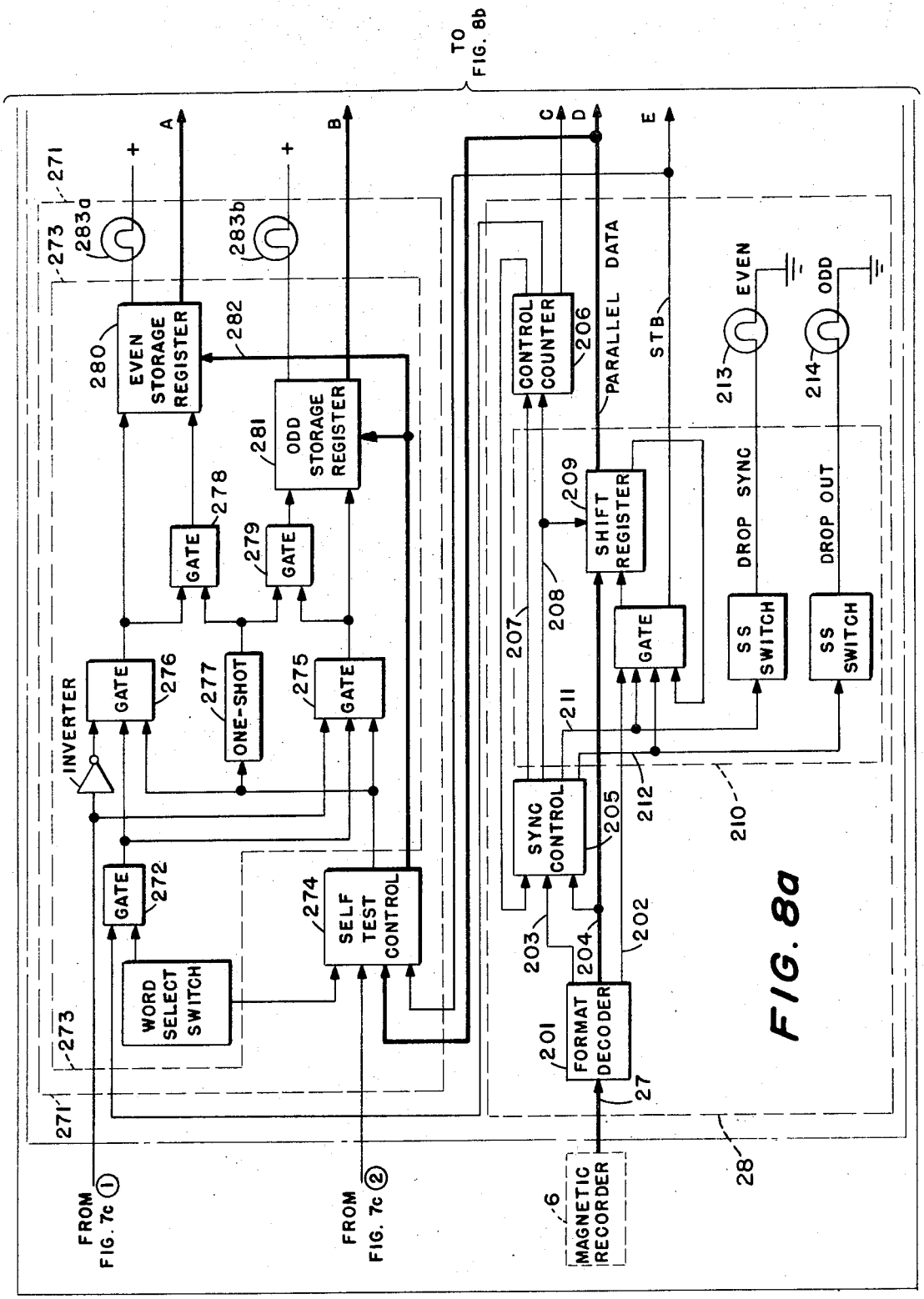

RADAR VIDEO RECORDING SYSTEM

BRIEF SUMMARY OF THE INVENTION

This invention relates to a system that can record signals from one, two, or three search radars simultaneously. The radars may be either two or three dimensional systems. More specifically, the subject invention records real-time radar signals for subsequent reproduction into a radar display system. Antenna bearing and elevation angle signals are also processed in addition to the output of the radar receivers. The subject invention is divided into a video channel and a data channel. The video channel receives video signals, such as targets and clutter, along with various reference triggers and an elevation angle signal. The video is modulated, the triggers are conditioned, and the elevation angle is converted into a simple binary pulse train. All of these signals are summed and recorded on a magnetic tape. A separate track of a magnetic recorder is assigned for the video of each radar being recorded. The data channel receives the bearing information and various auxiliary inputs, such as coded-time signals. The data coming into this channel may be in either analog or digital form. The data channel converts all input data into a common digital format, places the data into a serial address system, and stores the data from all radars on a single track of the magnetic recorder. In the reproduce mode the subject invention can either deliver all signals in their original format to a display system or take those radar signals that were originally analog signals and reproduce them in a digital format. Of course, the converse can be performed, i.e. radar signals that were originally in a digital format can be received and reproduced as analog data, thereby permitting the recording of realistic presentations of aircraft raids that can be played back into the same weapons system or other weapons systems.

It is therefore an object of the invention to provide a digital recording system that will permit acquisitions of live radar environmental situations.

Another object of the invention is to provide a digital radar system that will collect data for analyzing special radar environments.

Another object of this invention is to provide a system which accommodates up to three search radars of two-dimensional and/or three-dimensional capability.

Still another object of the invention is to provide a digital recording system whose reproductions are indistinguishable from the original radar video displays.

It is another object of the invention to produce a flexible and reliable system that will reproduce radar display information without degradation of initial signal qualities.

A further object of the invention is to provide a digital recording system that can be advantageously used for personnel training and for radar system evaluation.

Another object of the invention is to provide a digital recording system which permits collection of radar data for real-time analysis.

A still further object of the invention is to provide a digital system which can record and reproduce command and control signals for external simulators and/or computer systems to perform a wide variety of functions which may be related to the recorded search radar presentations.

Still another object is to provide a digital recording system which may be used in developing specialized radar video processing equipment for a simulating radar and weapons system.

It is another object of the invention to provide a system which is capable of processing other analog and/or digital data for recording and playback.

And still another object of the invention is to provide a digital system which provides a capability of recording and playback for an EW (electronic warfare) simulator, the control signals of which system may be used to generate an EW environment corresponding to the search radar presentation.

Other objects, features, and characteristics of the invention will become more apparent and discernible when reference is made to the detailed description and also to the accompanying drawings.

BRIEF DESCRIPTION OF THE DRAWINGS

FIGS. 8a through 8d are companion parts of a detailed block diagram of the reproduce portion of the data channel of the subject invention.

DETAILED DESCRIPTION OF THE INVENTION

Figure 1:
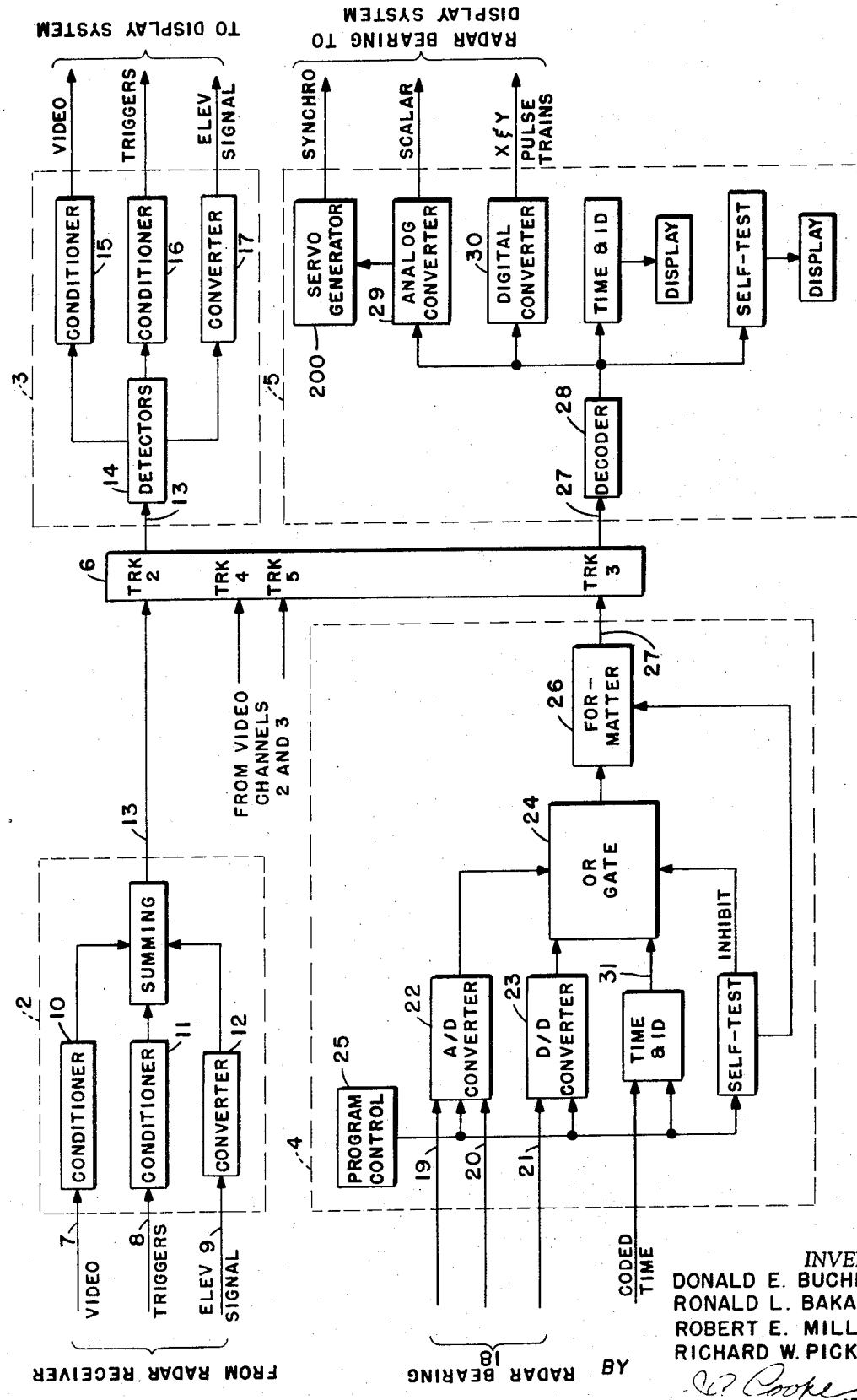
FIG. 1 is a basic block diagram of the subject invention.

The present invention consists broadly of two functional systems, i.e., a video channel and a data channel. For each of these systems there is a section relating to the record mode and a section relating to the reproduce (playback) mode. Referring to FIG. 1, it will be observed that the subject invention comprises a video record channel 2, a video reproduce channel 3, a data record channel 4, and a data reproduce channel 5.

The video system consists of three channels, which are practically identical. Each channel of the video function uses a separate tape track on a magnetic recorder 6. The data channel 4 uses a single channel and a single tape track. Thus the system can be thought of as having four functional channels, i.e., three video and one data.

The video record channel circuitry 2 prepares the video and associated information for the magnetic recorder 6. The video channels receive from each radar video signals 7, trigger signals 8 and elevation angle signals 9. The video signals 7 are modulated in a conditioner 10, which may conveniently comprise a pulse peak detector or a pulse width detector. The trigger signals 8 are shaped in a conditioner 11, which may be similar to the conditioner 10, and the elevation signals 9 are converted into a binary pulse train by a converter 12. The video record channel 2 combines all these signals into a single composite video signal 13. In the video reproduce channel 3, the circuitry essentially separates the various signals from the composite video signals 13 via detectors 14, restores them to their original parameters via conditioners 15 and 16 and converter 17, and feeds them out as independent signals.

The data record channel 4 receives radar bearing signals 18 from independent sources. The radar bearing signals 18 come in all forms: scalar analog signals 19, synchro analog signals 20 or digital pulse trains 21. Regardless of the type of incoming radar bearing signals, they are converted into the proper digital signal by either of digital converters 22 or 23. The selected digitized radar bearing signal is gated in an OR gate 24 with timing signals 31. The gating sequence is determined by a program control unit 25. The data record channel 4 then formats all signals via a formatter 26 into a single multiplexed digital signal 27.

Like the video reproduce channel 3, the data reproduce channel 5 separates all the information contained in the multiplexed digital signal 27 via a decoder 28, reproduces it via an analog converter 29 and a digital converter 30 and feeds it out to display systems or other equipment. Because all signals were originally converted to a common digital signal, a unique feature of the system is available. For instance, suppose that sine and cosine values came into the system as synchro analog signals and that these were coded into a digital format and then recorded. It is possible with the subject invention to retrieve these data in their digital form and, in the reproduce circuitry, output them as either synchro analogs or digital pulse trains. Thus one type of radar display system may be used when recording signals, and a different type of radar display system may be used to display the signals.

Figure 2:
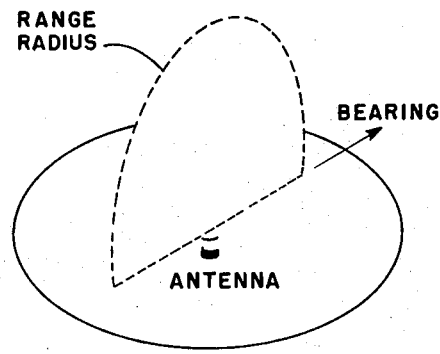
FIG. 2 is a diagram showing data capabilities of a two-dimensional radar.

Certain search radars are capable of fixing an aircraft in two dimensions, as is shown in FIG. 2. Because the radar in pointing in a particular direction at the moment that it receives the echo pulse, knowing the bearing angle for that moment places the aircraft in bearing. By measuring the elapsed time from transmit to receive, the radar can also determine the range of the aircraft. This radar, however, cannot fix the aircraft at a specific elevation angle because its antenna shape is such that an echo pulse can come in from many angles in the elevation plane. This type of radar (with bearing and range data) is therefore considered a two-dimensional system. It produces a master trigger, TM, which, as a reference point, indicates when the pulse was transmitted. It also produces a video signal which is the received echo pulse and is delayed from the master trigger by an amount proportional to range.

Figure 3:
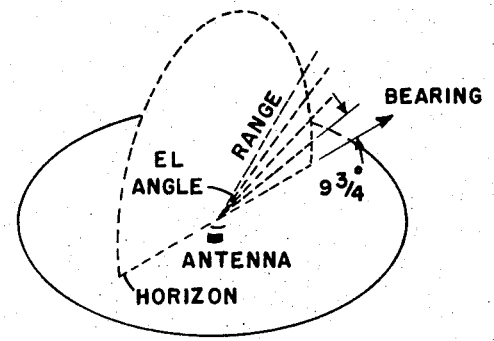
FIG. 3 is a diagram showing data capabilities of a three-dimensional radar.
Figure 4:
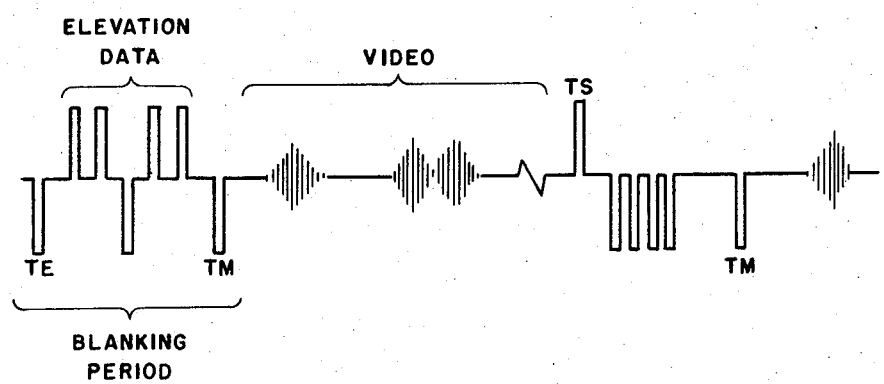
FIG. 4 is a chart showing the composite video signal.

With reference now to FIG. 3 other types of radars are known as three-dimensional systems because they can fix an aircraft at a specific elevation angle, in addition to bearing and range. They are able to do this by having an antenna array that directs the beam within narrow sectors of the elevation plane. In a sense, then, the antenna scans not only in bearing, but also in elevation. These radars also produce another trigger, a reference point which denotes end of sweep. Since the end-of-sweep trigger, TE (FIG. 4) occurs at the start of a blanking period and just a short time before the master trigger, it is also referred to as the early trigger. During the first portion of elevation scan a surface trigger, TS, is generated for each scan. Each time the radar crosses the horizon (or 0° elevation) it also generates a horizon trigger, TH With reference again to FIG. 1, channel 2 contains circuitry for processing the video signals 7 and all the trigger signals 8 that might come from a three-dimensional radar. Since the three-dimensional radar is simultaneously scanning in elevation, it also receives an analog signal 9 representing the elevation angle during that particular scan. This analog is converted into a coded binary number since recording it as it comes in would require a separate tape track just for the analog signal. The binary number takes up only a small portion of the scan time and is therefore easily fitted into the blanking period of the video signal. The triggers are encoded according to polarity, and the video is modulated to provide a signal that most easily fits into the bandpass of the magnetic recorder. The triggers are summed together with the modulated video and coded elevation to produce the composite video signal, as shown in FIG. 4.

Figure 5A:
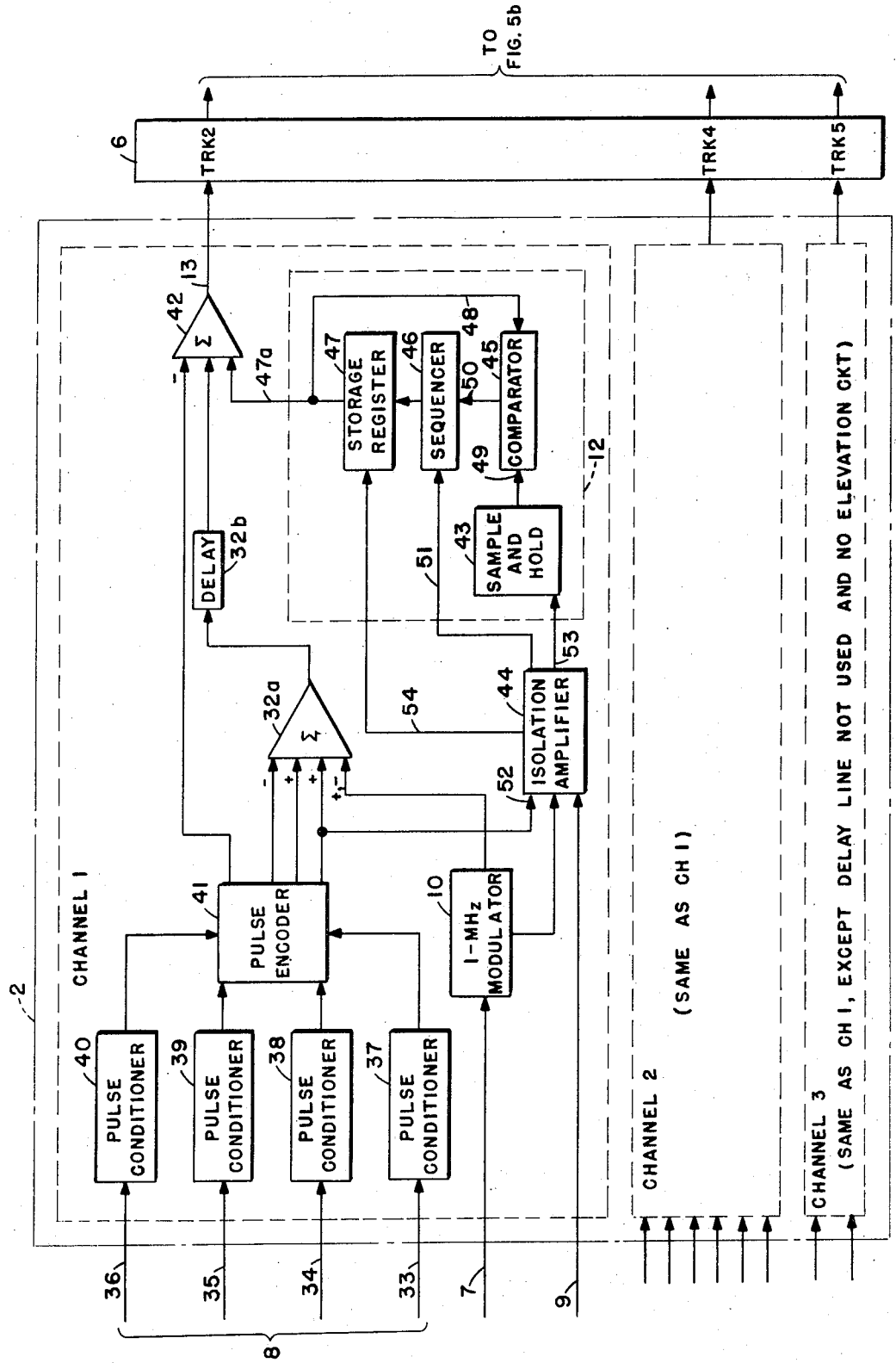
FIGS. 5a and 5b are companion parts of a detail block diagram of the video channels of the subject invention.
Figure 5B:
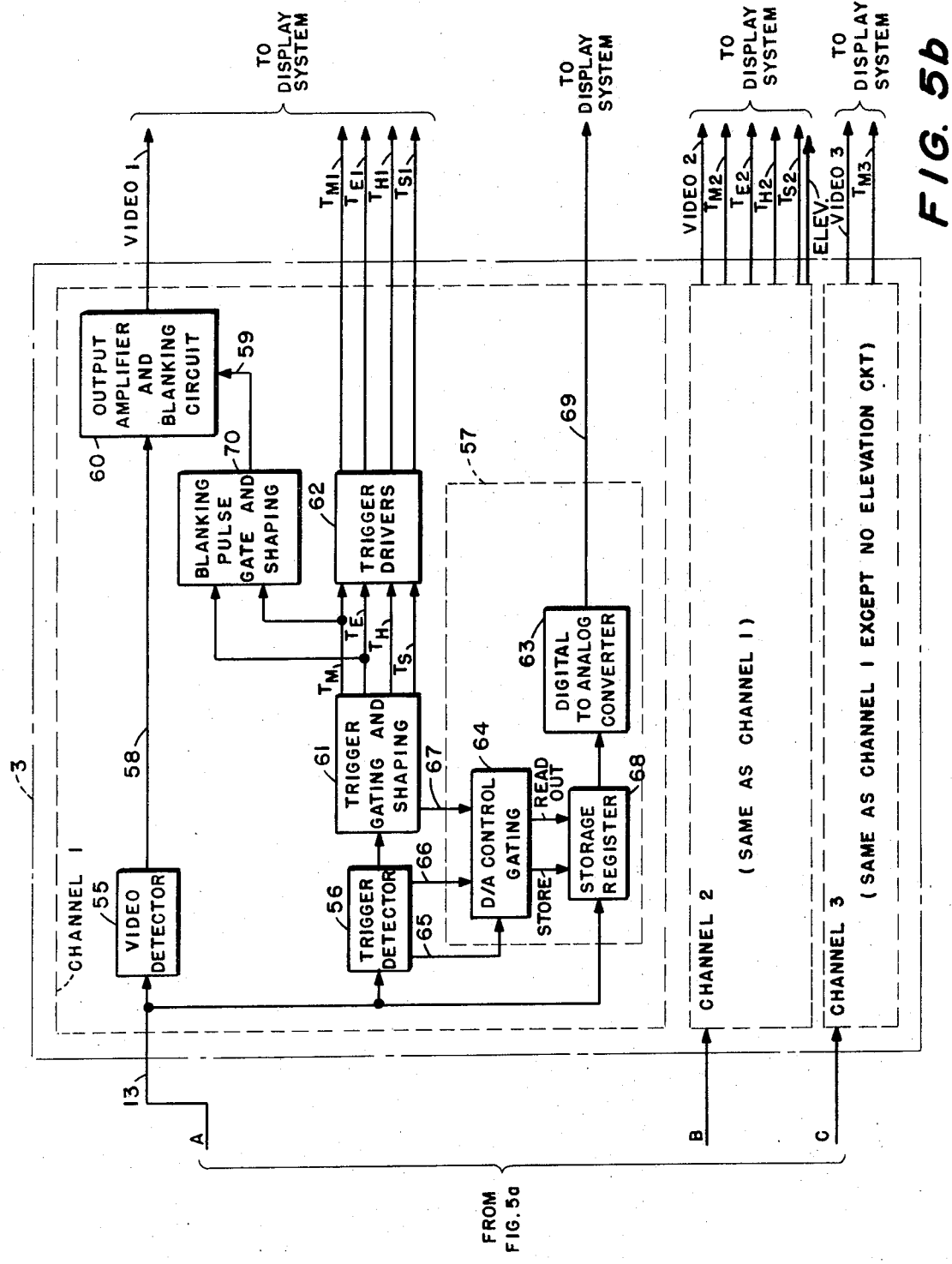

With reference now to FIGS. 5a and 5b, there is shown a detailed block diagram of the record and reproduce channels 2 and 3, respectively, of the video system. A master trigger (TM) 33, an end-of-sweep trigger (TE) 34, a horizon trigger (TH) 35, and a surface trigger (TS) 36 are each applied to conditioning circuits 37, 38, 39 and 40, respectively, wherein a logic voltage level is established for each signal. The signals emergent from the conditioning circuits 37 through 40 have a standardized voltage logic level and are then applied to a pulse encoder circuit 41 which is essentially a monostable multivibrator for producing a standardized pulse width. Also within encoder circuit 41, the standardized triggers are coded with different polarities for gating into the format used in recording the signals on tape. Early and master trigger signals from the radar system are converted into positive pulses, whereas horizon trigger signals and surface trigger signals are converted into negative pulses.

Video signals for all three video channels are each in the form of a varying, positive DC voltage level. This DC signal cannot be directly recorded by the magnetic recorder. For this reason, video modulator 10 modulates the radar video signal at a specified high frequency rate (e.g. one megahertz) to provide a bipolar signal useable by the magnetic recorder 6.

To produce the composite video that is recorded, the triggers [except for TS (FIG. 4)] and the modulated video signal must be summed and delayed. This is performed in a summing amplifier 32a and a delay circuit 32b. Summing amplifier 32a also inverts the TE TM, and TH pulses. These inversions make the TE and TM pulses in the composite video signal negative, while the TH signal is positive. The three triggers retain their original timing relationship with respect to the video signal and to each other. The output of the summing amplifier 32a is combined with the negative TS signal in a summing amplifier 42 along with a serialized elevation signal 47a to produce the composite video signal 13 which contains the composite video, the four trigger signals, and the serial elevation data.

Elevation data from three-dimensional radar systems is in the form of an analog signal $V_r$ sine E. Video channels 1 and 2 contain identical circuitry for converting the analog signal into a serial digital signal and inserting the digital data into the blanking period of the delayed mixed video signal. The elevation analog signal 9 from the radar system is applied to a sample and hold circuit 43 through an isolation amplifier 44. The sample and hold circuit 43 is triggered by the leading edge of a TM input 52 from the radar system. When the input goes positive the sample and hold circuit 43 begins sampling; when the signal returns to zero, the sample and hold circuit switches to a hold mode. In this way the data is sampled at each radar sweep, revising the elevation data that is recorded. A comparator 45, sequencer 46 and storage register 47, along with sample and hold circuit 43, from a closed loop analog-to-digital converter 12. In comparator 45 the parallel count 48 from the storage register 47 is converted to an analog signal which is summed with the sample and hold analog output 49. This summed signal is compared to a reference voltage to produce an error signal 50 from comparator 45. The error signal 50 from the comparator 45 is either positive or negative as long as the output count from the storage register 47 does not match the analog input signal 49 to the comparator. The polarity of error signal 50 indicates whether bits inserted into storage register 47 make the total count too large or too small. When the analog signal derived from the parallel count 48 is equal to the sample and hold amplifier output 49, the error signal 50 is zero and the conversion is complete. Analog-to-digital conversion begins in sequencer 46 by a start signal 51 from the isolation amplifier 44. This start signal occurs at the trailing edge of the TM signal 52 which controls the sample and hold circuit 43. Thus the sample and hold circuit 43 will be in the hold mode by the time analog to digital conversion beings. A conversion-started signal, resulting from the action of the start signal 51, initiates a clock signal within the sequencer 46 to generate the digital signal contained in the storage register 47. Isolation amplifier 44 also provides a reset signal 54 to storage register 47 before revised elevation data is to be sent in. The serial output 47a of storage register 47 is then applied to the summing amplifier 42 and is subsequently recorded on magnetic recorder 6.

During playback of the recorder 6 the composite video signals from tracks 2, 4, and 5 are fed to three identical video reproduction channels 1, 2 and 3 (FIG. 5b). Video reproduce channel 1 contains a video detector 55, a trigger detector 56, and an elevation angle detector 57. These detectors separate video, trigger, and elevation signals respectively from the composite video signal 13. The output 58 of the video detector 55 is a demodulated video signal that simulates the original video signal recorded from the search radar system. A pulse signal 59 from a blanking pulse gate and shaping circuit 70 controls a blanking circuit in an output amplifier 60 of the video channel. The blanking signal insures that no trigger signals are left in the video. Trigger signals detected from the composite video signal are processed by a gating and shaping circuit 61 to reconstruct the proper timing relationships among the triggers and to standardize the output trigger widths. Master and early trigger signals from the gating circuits provide timing control for generation of the blanking signal applied to the video output amplifier 60. The outputs of the gating and shaping circuit 61 are four separate trigger signals applied to trigger driver circuit 62 which provide output triggers of the proper level to the radar distribution system.

For two-dimensional display units, channel 3 provides a video signal and master trigger. For three-dimensional display units, channels 1 and 2 each provide a video signal, four trigger signals (as applicable), and an elevation analog signal.

The elevation analog signal for three-dimensional displays is reconstructed by a digital-to-analog converter 63 which is controlled by a digital-to-analog control gating circuit 64. Positive and negative outputs, 65 and 66 respectively, of the trigger detector 56 and an early trigger signal 67 are gated in the control gating circuit 64 to signal a storage register 68 to store the digital elevation code representing the elevation for each radar sweep. The readout of the storage register feeds the analog-to-digital converter 63, which provides an analog elevation output signal 69.

The most important function of the data channel is to process bearing angles. Bearing angle information enters the system in the form of sine and cosine functions, or the system itself generates the sine and cosine functions directly from the bearing angle signal. Generating both sine and cosine equivalents is done to maintain angle accuracy. If a single, absolute value for the angle were used, it might be subject to degeneration or even mismatch between radar and display systems. The sine and cosine functions, however, maintain a specific relationship both to each other and to the angle from which they are derived. For example, a 30° bearing might be equal to 10 volts or 2 volts or 17 volts (depending on a given system), but a sine function of 0.5 and a cosine function of 0.866 always represent 30°.

Figure 6:
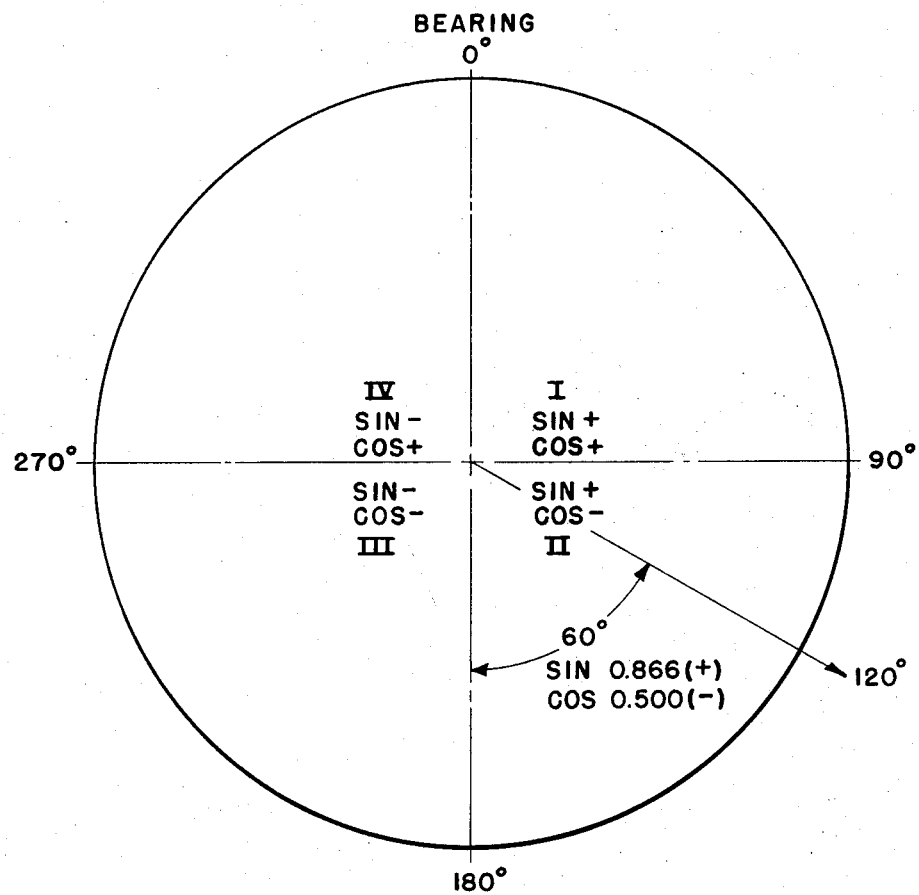
FIG. 6 is a chart showing the quadrant locations of bearing angles.

With respect now to FIG. 6, in processing sine and cosine information the signs of the values are extremely important since they specify the quadrant in which the angle is located. For example, a plus sine value and minus cosine value for an angle place the angle in the second quadrant. The sine and cosine values define the angle within the quadrant.

Figure 7A:
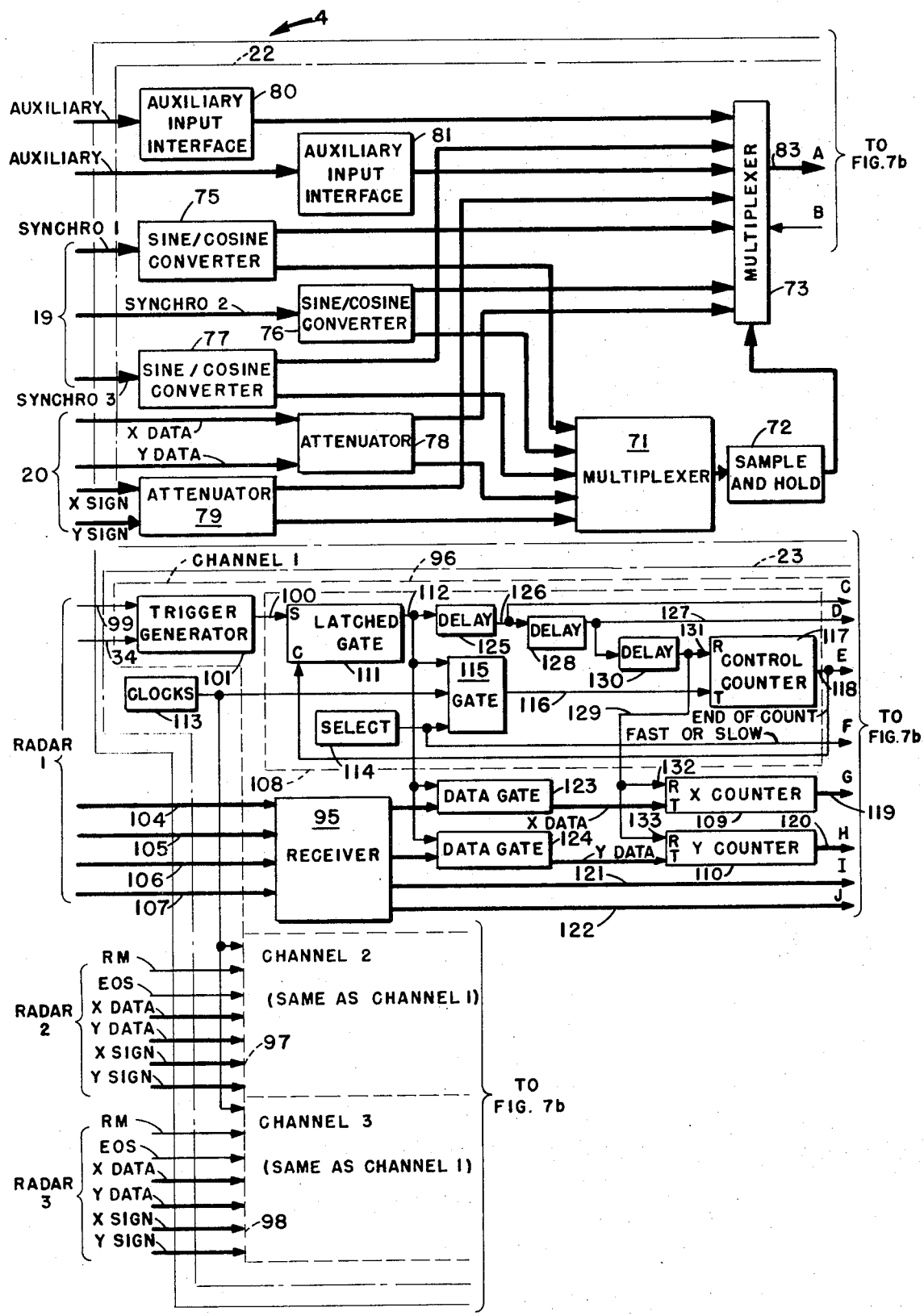
FIGS. 7a through 7d are companion parts of a detail block diagram of the record portion of the data channel of the subject invention.
Figure 7B:
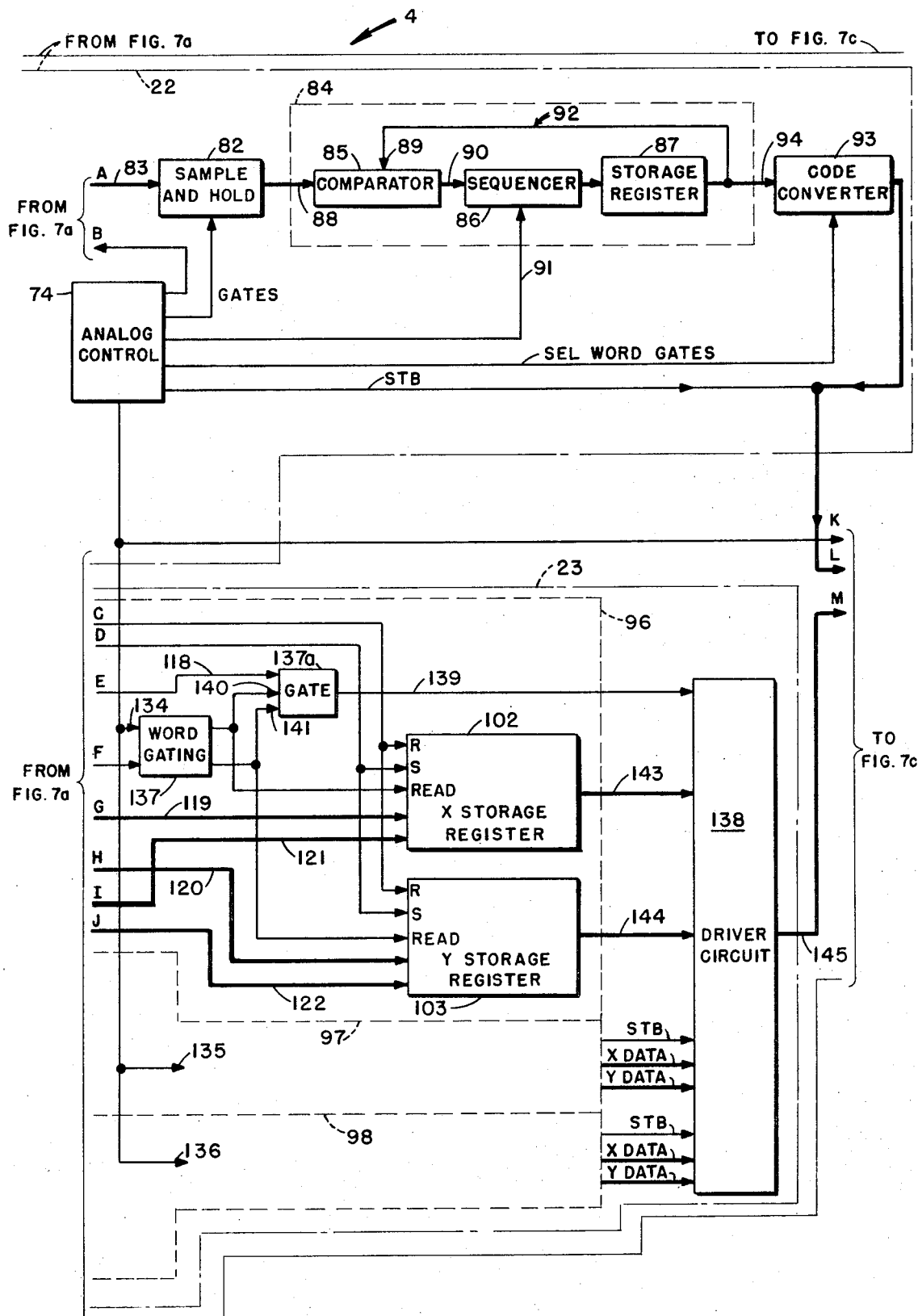
Figure 7C:
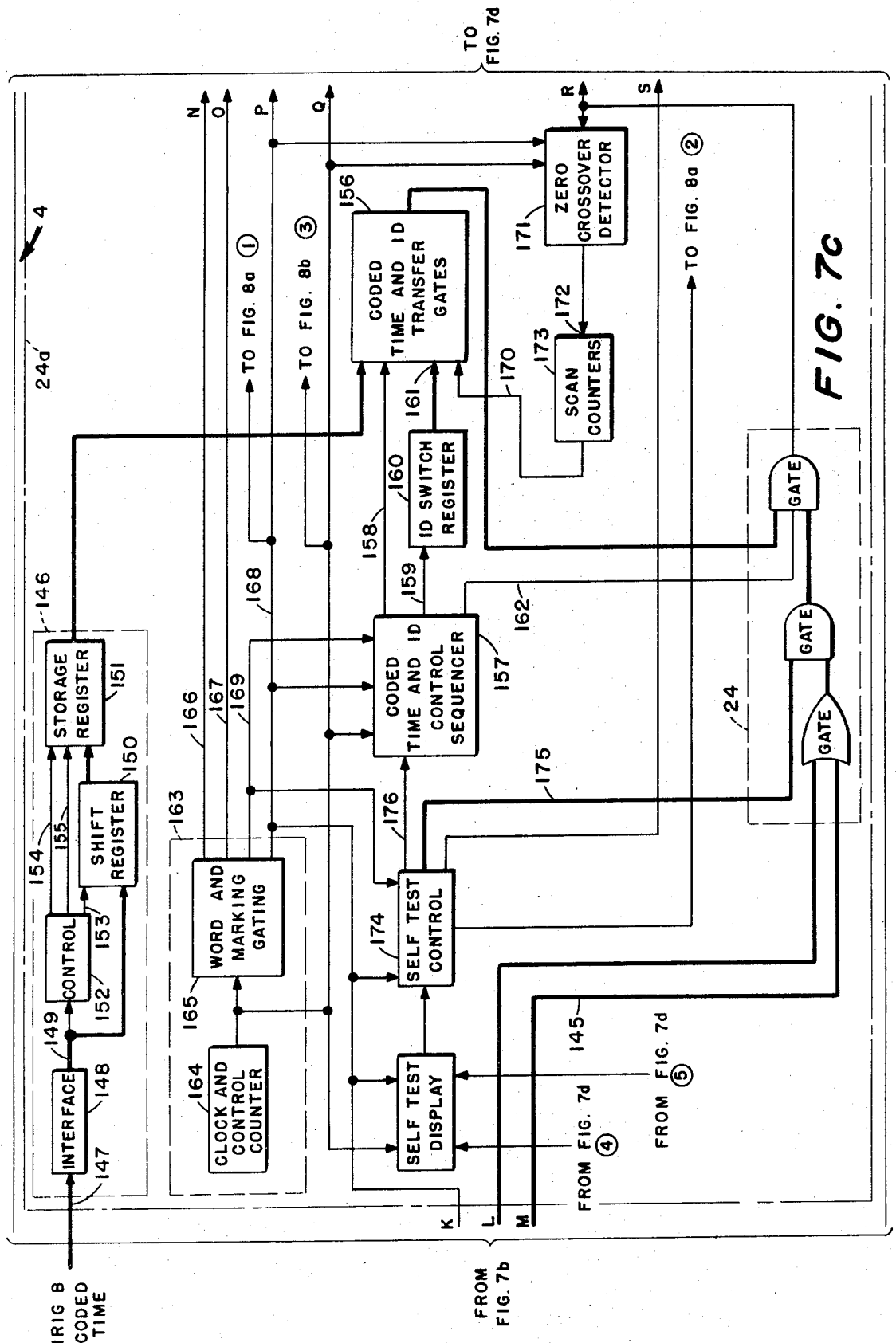
Figure 7D:
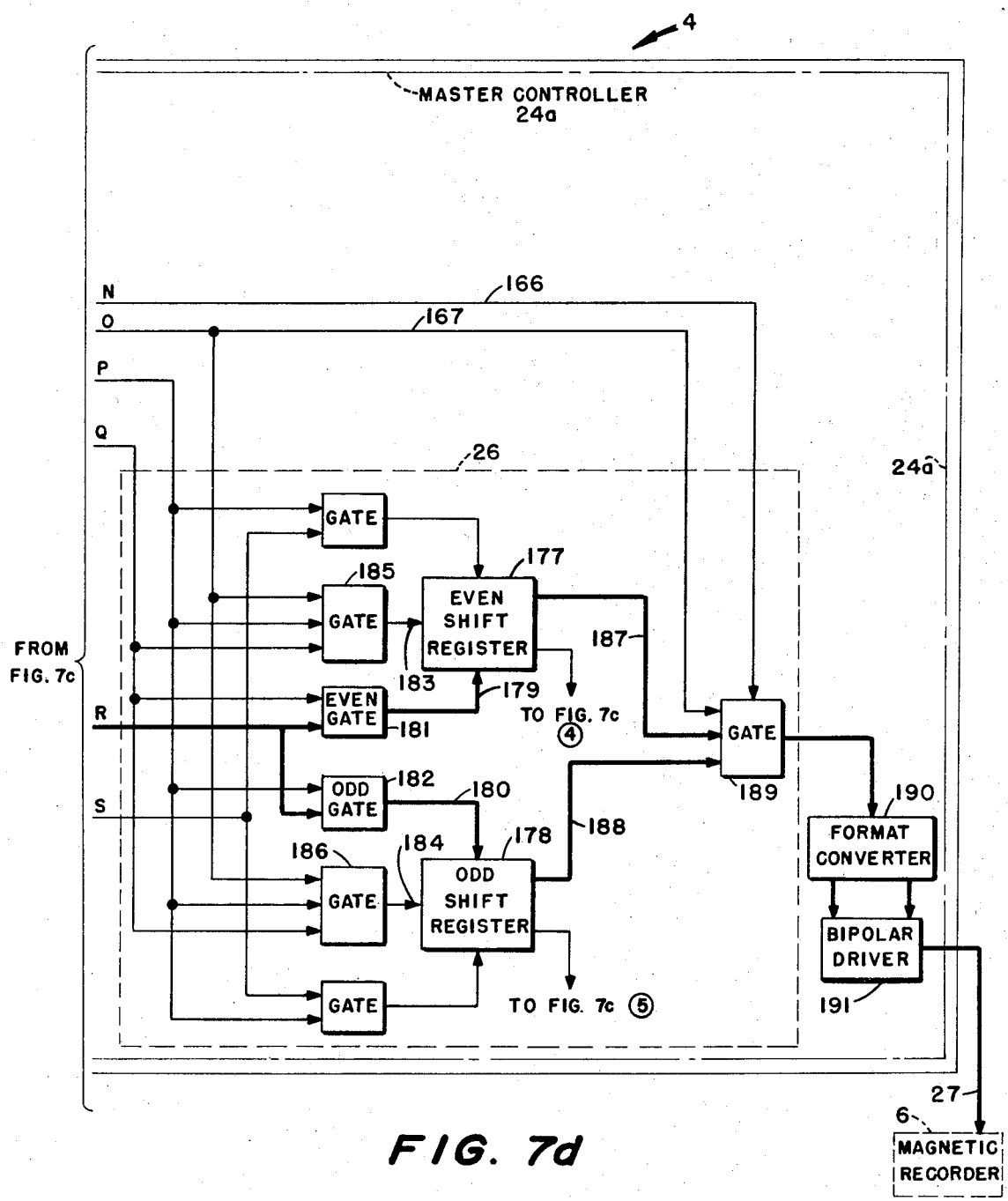

Referring now to FIGS. 7a through 7d, bearing data may come into the system in a serial form that requires little processing. Bearing data may, however, come into the system in analog form as either synchro signals 19 or scalar signals 20. The analog converter 22 takes this information, generates sine and cosine analog equivalents, and then changes both the sine and cosine analogs into binary numbers. Where the radar develops digital bearing angle data, this data will be in a different digital format from that which is required within the subject invention. The digital converter 23, therefore, must reformat this data into a usable form. The resulting binary numbers are temporarily stored until the proper address word occurs, then they are fed out to a master controller 24a (FIG. 7c). More specifically, the OR gate 24, format generator 26, and program control 25 function collectively as the master controller unit designated as 24a in FIGS. 7c and 7d which selects and formats the data 27 to be recorded on track 3 of the magnetic recorder 6. The formatter 26 takes all the parallel bits of words and puts them into a serial form placed at the proper address. It then inputs this serial train of words onto the magnetic recorder 6.

Referring again to FIG. 1, there are four main units involved in the data record channel: the formatter 26, the OR gate 24, the analog/digital converter 22, and the digital converter 23. The analog converter receives either synchro 19 or scalar 20 analog voltages and produces a binary equivalent. The input signals are first converted into a common analog voltage range; then the analogs are multiplexed, and the multiplex signal is serially converted into parallel binary numbers. The analog converter record circuitry 22 has three sine/cosine synchro converters 75, 76, and 77 (FIG. 7a) that accept five-wire synchro analog inputs and produce sine and cosine equivalent analogs. Each converter produces analog voltages proportional to the sine and cosine of that function. For example, assume that the bearing angle is 120°. The sine of this angle is +0.866, and the cosine is −0.500. The output of each converter is therefore +8.66 volts sine and −5.00 volts cosine. The analog converter record circuitry 22 also has two scalar attenuators 78 and 79 that attenuate X and Y scalar analog inputs to approximately half their input magnitudes. It also provides for two interface cards 80 and 81 for processing auxiliary inputs. An analog control circuit 74 (FIG. 7b) determines the multiplex sequencing of multiplexer 73 by generating word gates associated with each input. As stated previously, the subject invention can accommodate up to three radars; the three synchro signals and the three digital signals must share the three word-pair gates. Thus, if a digital signal is being used, only two of the synchro signals may be used.

The analog converter 22 must process up to 12 signals: sine and cosine for three synchro radar inputs, sine and cosine for two scalar radar inputs, and analog data for two auxiliary inputs. Rather than provide 12 separate circuits to individually convert the 12 sources of data to a digital code, the system instead multiplexes the twelve signals and then converts them, serially, one at a time. One multiplexer 71 (FIG. 7a) accepts the cosine inputs and the other multiplexer 73 accepts the sine inputs, the auxiliary data inputs and the composite signal out of multiplexer 71 as processed by a sample and hold circuit 72. A sample and hold circuit 82 (FIG. 7b) samples a portion of each multiplexed analog signal 83 and holds it at that level for the duration of a word. This presents a steady level to an analog-to-digital converter (ADC) 84. The ADC consists of a comparator 85, a sequencer 86, and a storage register 87. The comparator 85 compares the input analog level signal 88 with the summed level signal 89 caused by the feedback from the output of the ADC. If the two levels are not the same, an output signal 90 is applied to the sequencer 86. Based on the start pulse 91 from the analog control, the sequencer beings a binary count and places the count into the storage register 87. At each count, the count is fed back via feedback loop 92 to be compared with the analog input level. At some point the two levels balance, and the number stored in the register 87 represents the analog value in an equivalent binary number. Because the ADC 84 uses a binary count, a code converter 93 takes the ADC output signal 94 and converts it to a parallel number that is compatible with the system binary code.

The digital converter 23 via a receiver 95 (FIG. 7a) receives positive input pulse trains representing the sine (X data) and cosine (Y data) of the radar bearing angle, and it generates from each a 12-bit binary equivalent. Three identical channels 96, 97, and 98 (FIG. 7a) — one for each of the three radars — comprise the digital converter circuit 23. The converter 23 synchronizes its data with the radar by taking the end-of-sweep 34 and range mark 99 pulses and generating a simulated master trigger signal 100 in a trigger generator 101. Data is stored in X and Y storage registers 102 and 103, respectively, (FIG. 7b) for readout to the formatter 26 at the appropriate word gate.

The input from the radar is a pulse train representing the sine of the bearing angle and a pulse train representing cosine. The number of pulses in each train corresponds to the value of the sine and cosine function, and the pulse spacing corresponds to range. Thus, for example, since the sine of 30° is 0.500 and the cosine is 0.866, the X data (sine) might be 500 pulses and the Y data (cosine) might be 866 pulses. This would define the bearing of the radar, but it would not define the range of the radar. If the pulses are at the maximum pulse repetition rate, the radar range is therefore maximum; if the pulse repetition rate is half this, the range is half the maximum, and so forth.

Bearing data consists of four inputs for each radar: (See FIG. 7a) X data 104, Y data 105, sign of X data 106 and sign of Y data 107. As stated previously, the number of pulses in each series is proportional to the sine and cosine of the varying angle. The inputs which represent the sign of the X and Y signals represent the quadrant in which the antenna is pointing. The inputs which represent the X and Y pulse trains are applied to receiver 95 which consists essentially of operational amplifiers that limit and shape the input pulse thereby providing a constant amplitude output. There are four key elements to the digital converter 23. One is the trigger generator 101 that starts the sequence. The second is a gate generator 108 that permits X and Y pulses to pass during the gate period. The third element is comprised of X and Y counters 109 and 110, respectively, that count the X and Y pulses. The fourth element is comprised of the storage registers 102 and 103 that store the count and thus allow the data to be timing synchronized. The trigger generator 101 receives the end-of-sweep (EOS) trigger 34 and the range marks 99 from the radar. The EOS trigger 34 sets a flip-flop within the trigger generator and the subsequent range mark signal 99, which coincides with range zero and therefore is equal to a master trigger, resets the flip-flop. The reset, or trailing edge, of the flip-flop fires a single-shot output to produce the simulated master trigger output 100. This trigger signal 100 sets a latched-gate flip-flop circuit 111 which consists of latched NAND gates. Output signal 112 of flip-flop circuit 111 can be considered the "on" gate that regulates clock 113 in a gating circuit 115. There are two clock rates. The fast rate in the preferred embodiment is 16 times that of the slow rate. The fast rate corresponds to one particular radar system while the slow rate corresponds to another radar type. The setting of a select switch 114 causes gating circuit 115 to gate through either the fast or the slow clock during the "on" period of output signal 112. A gated clock output signal 116 toggles a control counter 117, causing it to count up to maximum. At the end of the count, the control counter 117 emits an end-of-count pulse 118 that clears the latched-gate flip-flop 111 causing the output gating signal 112 to go "off".

During the "on" period of the output gating signal 112, the receiver 95 conditions and passes the X and Y data 104 and 105, respectively, as well as the signs of X and Y data, 106 and 107, respectively. The data pulses are gated through to the X and Y counters 109 and 110, respectively, which merely count the number of X and Y pulses. The X and Y counts 119 and 120 respectively, in parallel form, are applied to the X and Y storage registers 102 and 103, respectively, (FIG. 7b) along with the signs of X and Y data, 121 and 122 respectively. At the end of the gate of output gating signal 112, X and Y pulses from the receiver are inhibited from the X and Y counters by the closing of data gates 123 and 124. At this point, the binary counts from the X and Y counters 109 and 110 respectively hold the equivalent binary numbers of the pulse train. As the gate of output gating signal 112 goes "off", it causes a delay circuit 125 to emit a delay pulse signal 126. This delayed pulse signal 126 is the reset to the storage registers 102 and 103, and it clears them to receive the data from the X and Y counters 109 and 110 respectively. A second delayed pulse 127 produced by delay circuit 128 sets the registers, permitting the parallel counts from the X and Y counters to enter the registers. Then, a third delay pulse 129 produced by a delay circuit 130 resets the control counter 117 and both data counters by way of the reset direct ($R_D$) inputs 131, 132, and 133. At this point, the storage registers 102 and 103 hold the binary equivalent of the X and Y functions of the bearing angle. If that particular channel is being used, word gates for radars 1, 2, and 3 are routed to the three channels at 134, 135 and 136 respectively. These are the same word gates used in the analog converter 22, so obviously only three types of radar signals out of the total six possibilities (three synchro and three digital) can be used at any one time. The word gates via gating circuit 137 read out the X data during the particular even word, and read out the Y data during the particular odd word. The data, still in parallel form, is fed out through a driver circuit 138, along with a strobe (STB) pulse 139. The STB pulse is subsequently used to strobe the data into the formatter 26. If this pulse is not present, data for that frame is lost. To produce true data, the STB pulse 139 results from gating in gating circuit 137a the word gates outputs 140 and 141 with the end of the count signal 118 from the control counter 117 (FIG. 7a). Thus, if the output gating signal 112 is in the process of changing when the word gate appears — causing a possibility of reading out to the storage registers 102 and 103 while it is reset — the STB pulse 139 is inhibited. The X and Y data 143 and 144 respectively, plus the STB pulse 139, are fed to the common driver circuit 138 from all three channels. The output 145 of driver circuit 138 consists of parallel binary numbers representing sine and cosine for each channel.

A coded time converter circuit 146 (FIG. 7c) accepts IRIG B coded time. The coded time signal 147 contains several binary-coded numbers denoting the time of day and the day of the year. This signal may be either positive or negative pulse logic, or it may be carrier-modulated. An interface circuit 148 accepts any of these signals and generates a positive logic, pulse train output signal 149. The pulse train feeds a shift register 150, and each stage of the shift register becomes a parallel data output to a storage register 151. The control circuit 152 senses the pulse train 149 to determine the start of the frame; from this it generates a clock signal 153 for shifting the data into the shift register 150, and it generates set and reset pulses 154 and 155, respectively, to the storage register 151. Since all the desired data occurs during the first 41 bits of the frame, the control circuit 152 allows the shift register 150 to shift in the first 41 pulses. At this point, the first stage of the shift register holds bit 41, the second holds bit 40, etc., until the shift register 150 clears the storage register 151, and then sets in the 41 parallel bits of data. The parallel data is then sent to a time and ID (identification) transfer gate circuit 156.

A time and ID control sequencer 157 generates the subframe gates at 158 and 159 that carry all the slow changing data. The subframe gate consists of certain address words, e.g. time that does not change as fast as the normal frame rate. Consequently, a subframe will equal several normal frames and will occur at only a fraction of the normal frame rate. Some of these subframe gates 158 are sent to the time and ID transfer gate circuit 156 to gate through the coded time data. The other subframe gates 159 go to switch register 160 to gate out identification data 161. The sequencer 157 also generates at 162 the STB pulses for the subframe words and sends them to a parallel data OR gate 24.

The control circuit 163 includes a clock and control counter 164 and a word and marking gating circuit 165. The clock and control counter 164 generates various counts from a basic crystal oscillator frequency. The word and marking gating circuit 165 combines these counts in various ways to produce a frame marker 166 indicating the start of each frame, word markers 167 indicating the start of each word, word gates 168 for the start of various other data, and other special markers 169 (triggers). The frame and work markers 166 and 167 respectively go to the formatter 26 for insertion into the 96-word frame format, while the word gates 168 are distributed to the specific circuits dealing with the data that goes into those particular word addresses.

The final data that is processed through the time and ID transfer gate circuit 156 is a scan count signal 170. A zero crossover detector circuit 171 senses the signs of the sine and cosine functions for each of the three recorded radars. Since there is only one point (zero bearing) where the cosine is positive at the instant that the sine goes positive, this circuit senses this point and sends a trigger 172 to a scan counter 173.

A self-test control circuit 174 generates a word pair gate signal 175 that is used to test the operation of the circuit. The self-test control circuit 174 sends an inhibit signal 176 to block passage of the normal data while self-test data is routed to the formatter 26 instead. Self-test data consists of binary-coded words that, like the other data coming out of the OR gate 24, is in parallel. At this point, all data exists as parallel bits occurring during their assigned word addresses. All the data is made into a composite parallel signal by the parallel data OR gate 24. Parallel data is placed into even and odd shift registers 177 and 178, respectively, (FIG. 7d) at each bit stage through the set direct ($S_D$) inputs 179 and 180 respectively. The $S_D$ inputs are produced by even gate circuit 181 and odd gate circuit 182, respectively. In either case, the data is shifted through each shift register by clock signals 183 and 184 which are produced from gating circuits 185 and 186, respectively. Half of the formatter 26 handles even words, while the other half handles odd words. This is done so that one half can be loading while the other half is dumping. All the data is gated to the even or odd portion of the circuit by even and odd word gates.

Serial data from outputs 187 and 188 of even and odd shift register circuits 177 and 178 are combined in gating circuit 189 with the frame and word markers 166 and 167, respectively, from the word and marking gating circuit 165 (FIG. 7b) and are sent into the format converter 190. The format converter puts the data into a modified Manchester code format and applies it to a bipolar driver 191. The bipolar driver provides the power to drive the signal, passing it to the magnetic recorder 6 (FIG. 1).

Figure 8B:
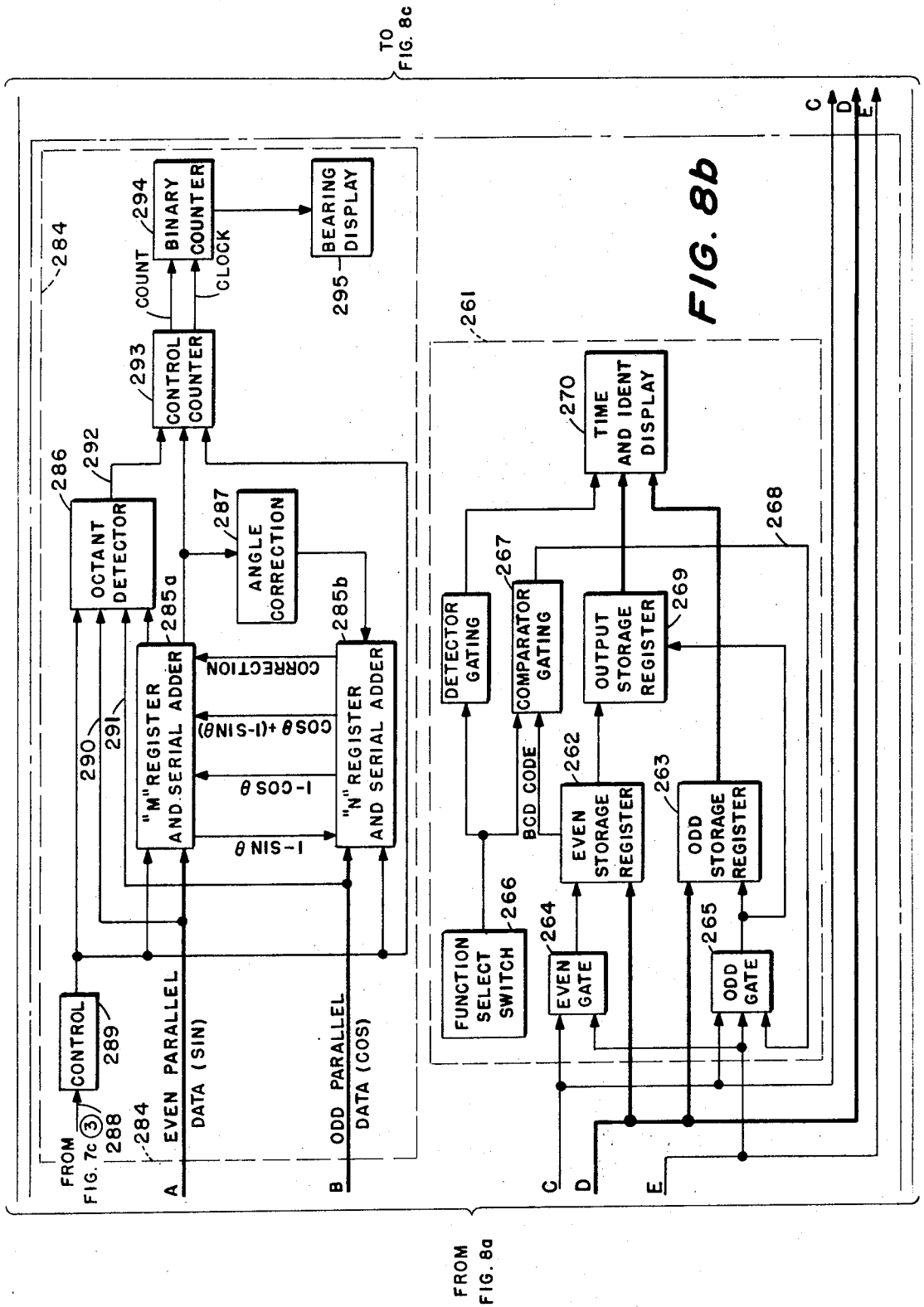
Figure 8C:
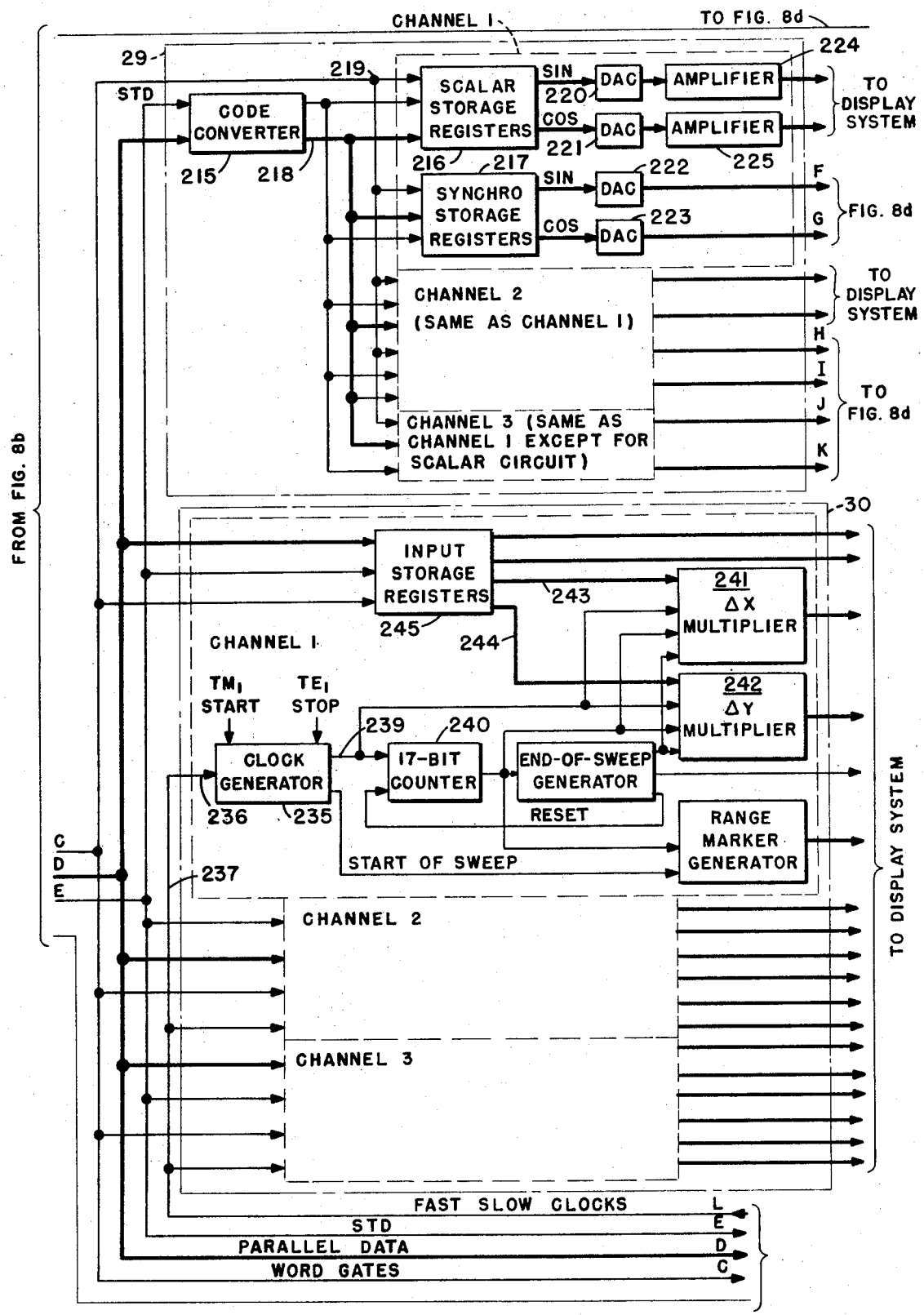
Figure 8D:
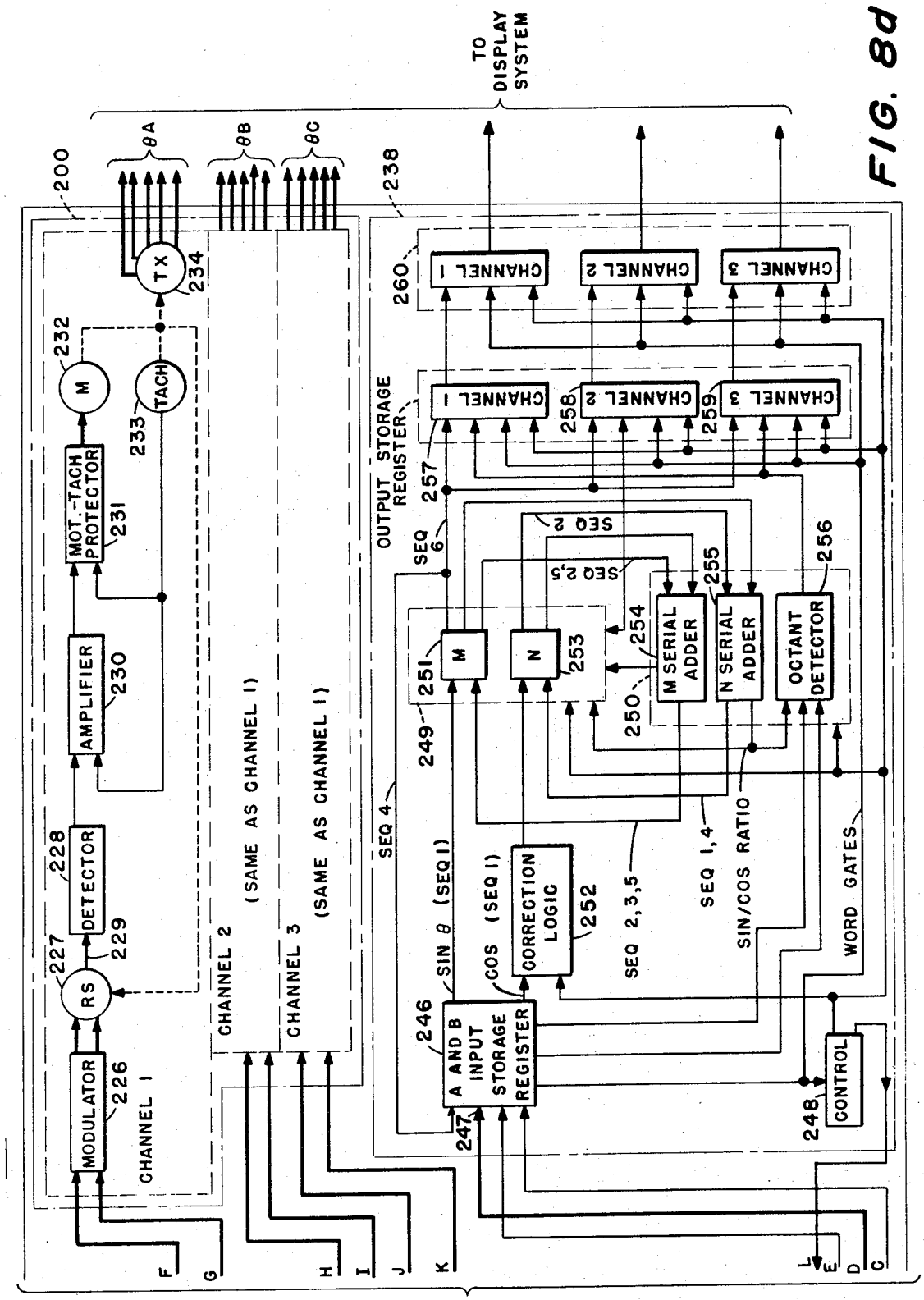

The data channel reproduce circuitry of FIGS. 8a through 8d, like its counterpart in the video channels, reverses the record circuitry procedures. The decoder 28 (FIG. 1) separates the various words and places them in parallel form, except for that data that must go out in serial form. The analog converter 29 (FIG. 1) then changes the parallel digital data into an analog equivalent which is fed out as a scalar voltage, and said data is also applied to a servo generator 200 (FIG. 8d). The servo generator changes the simple analog voltage into a synchro analog. The digital converter 30 takes the parallel binary information and generates a pulse train type of digital signal that is identical to the type of signal applied to the record portion of the digital converter. Time and identification information is displayed as is the self-test data.

Referring now with greater specificity to FIGS. 8a through 8d, there is shown the record and reproduce modes for the data channel. There are five main units involved: a self-test circuit 271, the decoder 28, a trig converter 284, the analog converter 29 and its associated servo generator 200, and the digital converter 30 and an associated digital θ converter 238 (FIG. 8d). In general the decoding circuit receives the serial data from the magnetic recorder, extracts synchronizing pulses for words and frame, generates a clock at the bit rate, provides word gates and converts the data into parallel form. The format decoder 201 (FIG. 8a) receives the serial data 27 from the magnetic recorder 6. From the serial data it generates a clock signal 202 containing 14 pulses; one for each of 12 data bits, one for the sign bit, and one for the parity bit. It also produces a sync signal 203 at the word rate, and it provides complemented serial data 204. A sync control circuit 205 receives the sync signal and the serial data. By gating the sync pulses with the serial data, it extracts the frame marker 207 with which to synchronize a control counter 206. It also provides a word/frame marker pulse 208 for resetting a shift register 209 at the end of each word. In addition, the sync control circuit 205 guards against transmitting false marker pulses (such as noise) and, under certain circumstances, transmits a simulated marker pulse should the original be lost in a magnetic tape dropout. By doing this, it allows the rest of the decoding circuit to continue effective operation.

The control counter 206 provides selected counts. It counts the word/frame marker pulses and resets with the frame sync pulse, providing a final count to the sync control circuit 205 for comparison with the frame sync. A sensor-data decoder 210 clocks the serial data into the shift register 209, and it provides a strobe pulse that occurs after all data for each word is in the shift register. It also takes the drop sync and drop out signals 211 and 212 respectively from the sync control circuit and applies them to lamp circuits 213 and 214. When the two lamps — the even 213 and odd 214 lamps — are on, they signify that the system is searching for a frame marker and that more than one word marker has not been detected.

The analog converter reproduce circuitry 29 (FIGS. 1 and 8c) has three channels for processing three synchro sine and cosine analog drive signals. Two of these three channels can also process scalar sine and cosine analog signals. Parallel data is applied to a code converter 215. Essentially, the code converter reverses the process carried out by the code converter in the record circuit, wherein the data was complemented before it was converted into a binary number. Here, the data is complemented before it is converted into an analog equivalent of the binary number. The data is strobed into scalar storage registers 216 and synchro storage registers 217 by strobe pulse output 218 which is gated by the proper word gate signal 219. The stored binary data is applied to digital-to-analog converters (DAC's) 220 through 223, which produce DC analog voltages corresponding to the sine and cosine of the bearing angle. For scalar analogs, amplifiers 224 and 225 boost the voltage to provide the proper excursion for driving the scalar display equipment. For synchro analogs, the voltages must first be converted into synchro outputs, which task is performed by the servo generator unit 200 (FIG. 8d). In the servo generator, the sine and cosine voltages are each modulated in modulator 226 into a square wave signal swinging equally about zero or reference. The two signals are resolved in resolver 227 to provide an error signal 229 for a detector 228. The detector 228 integrates the error signal 229 and applies it to a motor amplifier 230. The amplifier provides the drive signal, via a motor-tachometer protector 231, for driving a motor 232. The motor-tachometer protector 231 senses tachometer 233 overspeed and overload conditions and interrupts the drive signal in the presence of such signals. The motor 232 drives the tachometer 233 and a synchro transmitter 234, and it attempts to null the resolver 227. With a dynamic input (signifying a revolving antenna), some amount of lag in the servo loop between the input and the resolver mechanical nulling results in the error signal 229 being constant to smoothly drive the motor and synchro transmitter.

The digital converter 30 (FIG. 1) generates digital pulse trains which represent the sine and cosine functions of the bearing angle. A clock generator 235 (FIG. 8c) receives at input 236 the basic system clock signal 237, generated in the digital θ circuit 238 (FIG. 8d) (which will be discussed in detail hereinafter), and passes a proper clock signal 239 (FIG. 8c). The clock signal 239 is counted by a 17 bit counter 240, and then applied to ΔX rate multiplier 241 and a ΔY rate multiplier 242 along with X and Y binary words 243 and 244, respectively, from input storage registers 245. The rate multipliers 241 and 242 combine counts according to the magnitude of the binary number of the X or Y data; that is, a maximum binary number (all 1's) produces the highest pulse rate, whereas lower binary numbers produce lower pulse rates. For a given range, the multipliers 241 and 242 provide a number of pulses corresponding to the value of the particular sine or cosine function. For example, the ΔX multiplier 241 might produce 500 pulses and the ΔY multiplier 866 pulses for a 30° bearing. The pulse spacing corresponds to range, whereby maximum range is the maximum pulse rate.

The digital θ circuit 238 converts the trigonometric values of sine θ and cosine θ into the angular values of θ (bearing angle) in degrees. The operation is similar to that performed by a synchro resolver, which is capable of resolving a vector into its quadrature components as well as reversing this function and combining the two quadrature components into the vector. The digital θ circuit operates as a combining circuit. In general terms, the digital θ circuit performs its function by first comparing the sine and cosine values to determine which is larger. Using the results of this comparison, one of the two empirical equations below is solved to determine the approximate angle in the first quadrant (0° to 90°).

$$\theta = 45° [\sin \theta + (1 - \cos \theta)] \quad (1)$$

for angles from 0° to 45°

$$\theta = 45° [\cos \theta + (1 - \sin \theta)] \quad (2)$$

for angles from 45° to 90°.

The results of the approximate solution is used to compute a correction factor which is added to the approximate solution to obtain the desired accuracy. The results of the sine-cosine comparison, along with the polarity data of the sine and cosine, is used to determine the quadrant of the angle. This quadrant data is combined with the results of the corrected solution to complete the conversion process.

Data from the decoder 28 is applied at input 247 to input storage registers 246 A and B (FIG. 8d). Even-word data (sine) is strobed into the A register on certain predetermined words and odd-word data (cosine) is strobed into the B register on certain other words. At the end of the computation, data for words are strobed into the output storage registers 257, 258 and 259. All events in the digital θ circuit are controlled by the word gates for the three radars and a set of 8 basic timing signals generated in the digital θ control circuit 248. These timing signals control a six-step sequence for a digital θ angle conversion. The sequence is as follows:

1. In sequence 1, M and N registers 249 and arithmetic logic unit 250 (FIG. 8d) are reset to their initial conditions, and the input data stored in the input storage register 246 are loaded into said M and N registers 249 and serial adder circuits within said arithmetic logic unit 250. The data representing sin θ is loaded in parallel into M register 251. Similarly, cos θ is routed through a correction logic circuit 252 (without change) into N register 253.

2. In sequence 2, the contents of the M and N registers 251 and 253 are read out in serial form and are applied to M and N serial adders 254 and 255 respectively. The M serial adder 254 receives cos θ data from the N register 253 and (1 − sin θ) data from the M register 251. These inputs are combined and the complement, sin θ + (1 − cos θ), is applied to and stored in the M serial adder 254. Similarly, the N serial adder 255 processes inputs of sin θ and (1 − cos θ) and applies the quantity cos θ + (1 − sin θ) to the N register 253. In addition, the N serial adder 255 determines whether the sine is greater or less than the cosine function. This sin-cos ratio data is applied to an octant detector 256 and to the M and N registers 249.

3. The operations occurring during sequence 3 depend upon the sin-cos ratio. If cos θ is greater than sin θ, the correct quantity is stored in the M register and no shifting of data is required. However, if sin θ is greater than cos θ, the quantity cos θ + (1 − sin θ) stored in the N register 253 is the desired quantity. During sequence 3, the data stored in the N register 253 is shifted into the M register 251 if sin θ is greater than cos θ.

4. In sequence 4, the N register 253 is reset to zero and then is loaded with the N-correction data. The correction data, which is derived from the M register 251 (which has contained the approximate solutions since sequence 3), is stored in the N register. The sign of sine and sign of cosine data from the input storage register are combined with the sine/cosine ratio data computed by the N serial adder 255.

5. In sequence 5, the N-correction data is routed through the M serial adder 254 to the M register 251 and combined with the approximate solution stored in the M register. The M serial adder 254 provides both the N-correction data and its complement to the M register 251. The uninverted N-correction data is used for angles from 0° to 45°. The complement of the N-correction data is used for angles from 45° to 90°. The M register 251 now contains the corrected value for the angle θ.

6. In sequence 6, the output of the octant detector 256 is combined with the contents of the M register 251 and is applied to three output storage registers 257, 258 and 259 (FIG. 8d), corresponding to radars 1, 2 and 3. Each storage register receives data which define the octant of the angle, and data which define the angular value of θ. At the end of each computation, a timing signal indicating end of computation is applied to the three output registers 257, 258 and 259. This timing signal is combined with an equivalent word gate at the pertinent output storage register to strobe the proper data into the proper register (for example, radar 1 data into storage register A). The output of each register is applied to a display system (not shown) through an output driver circuit 260.

Referring now to the time and identification circuit 261 (FIG. 8b), parallel data from the decoder 28 is applied to even and odd storage registers 262, 263 respectively. On even words of a frame an even gate 264 passes the strobe pulse, permitting it to clock the data into the even storage register 262. As stated earlier, there are 20 subframe words in the time and identification data. These 20 words are grouped into 10 word pairs. On each of the 10 subframe words the BCD coded number is extracted and compared with the BCD coded number coming in from a function select switch 266. When the selected word is reached, the two BCD codes coincides to generate in a comparator gating circuit 267 a subframe word select signal 268 to an odd gating circuit 265. When the subsequent odd frame word of the selected word-pair occurs, the odd gate 265 is enabled to pass the strobe pulse. The strobe pulse acts as the master clock, clocking the odd data into the odd storage register 263 and the even data into an output storage register 269. At this point, all the data for the word-pair is in the storage registers which subsequently feeds a display unit 270.

The self-test circuit 271 (FIG. 8a) displays any selected word pair. If one of the normal words is selected, a gate 272 in a test display circuit 273 picks out the matching word gate from the decoding circuit 28. A self-test control unit 274 passes all the parallel data and strobe pulses. Gates 275 and 276 in the test display circuit 273 receive the selected word gate and the strobe pulse. In addition, gate 275 receives odd-word enabling gating signal and the other gate 276 receives even-word enabling gating signal. The result is that one gate passes the strobe pulse at the selected even word, and the other gate passes the strobe pulse at the selected odd word. The strobe pulse also fires a single-shot signal via a monostable multivibrator 277, and the outputs are gated via gates 278 and 279 with the selected even and odd word strobe pulses. The leading edge of this pulse resets even and odd storage registers 280 and 281, respectively. A parallel data signal 282, meanwhile, is applied to the two storage registers 280 and 281. When the trailing edge of the strobe pulse occurs for the selected word moments later, it strobes in the data applied to the storage register. Each bit stage in the storage register 280 or the register 281 feeds a display lamp 283 or 284, causing it to go on if that particular bit is a logic 1. The stored data is also fed out to a trigonometric converter 284 to provide a resolved angle readout.

The trigonometric converter 284, outlined in broken lines in FIG. 8b, operates in much the same manner as the digital θ circuit in that it converts the trigonometric values of sin θ and cos θ into the angular values of the bearing angle θ. The mathematical basis for both circuits is identical, the difference being in the mechanization rather than the theory. As can be seen from FIGS. 8a–8d, the same computing elements used in the digital θ circuit are used in the trigonometric converter. These consist of an M register and serial adder 285a and an N register and serial adder 285b, an octant detector 286 and an angle correction logic circuit 287. The input to the trigonometric converter 284 consists of the 12-bit numbers generated by the self-test circuit 271 (FIG. 8a). This input, along with the data defining the sign of the sine and cosine functions, represents the data inputs to the converter 284. The clock input 288 to a control unit 289 of the converter 284 is the count which controls the timing signals used within said converter. All events within the converter 284 are controlled by the 10 timing signals generated by the converter control unit 289. The seven step sequence is as follows:

1. In step 1, the M and N registers and serial adders 285a and 285b are set to their initial conditions, and the cos θ data is loaded into the N register 285b. The input circuit of the register inverts the input so that the data stored in the N register 285b is the complement of cos θ, or $1 - \cos \theta$.

2. In step 2, the sin θ data is loaded into the M register 285a. As in the N register 285b, the input is inverted, so that the data stored is $1 - \sin \theta$.

3. In step 3, the contents of the M and N registers are serially read out and applied to the M and N serial adders. The serial adders combine the inputs and store (in the M and N registers) the quantities:
$\sin \theta + (1 - \cos \theta)$ in the M register 285a, and
$\cos \theta + (1 - \sin \theta)$ in the N register 285b.

In addition, the M serial adder computes the sin/cos ratio. This information is used in step 4. (The sin/cos ratio is also applied to the octant detector 286 which uses this data, along with the sign of sine 290 and sign of cosine 291 inputs. Output 292 of octant detector 286 is used in step 7.)

4. The operations in step 4 depend upon the sin/cos ratio computed in step 3. If the cosine is greater than the sine, the M register 285a contains the correct solution (Equation (1)) for the approximate angle, and no actions are required. However, if the sine is greater than the cosine, the N register 285b contains the correct solution (Equation (2)). If this latter condition is true, the contents of the N register 285b are transferred to the M register 285a. In either event, the M register 285a contains the correct approximate solution for θ at this time.

5. In step 5, the N register 285b is reset to zero to accept the N-correction data generated by the angle correction circuit 287 (FIG. 8b). The approximate θ solution stored in the M register 285a are applied to the angle correction logic circuit to derive the N-correction signal. The N-correction signal is applied to, and stored in, the N register.

6. In step 6, the N-correction signal stored in the N register 285b is combined with the approximate solution stored in the M register 285a. Again using the sin/cos ratio derived in step 3, the complement of the N-correction signal is used if the sine is greater than the cosine. If the cosine is greater, the unmodified N-correction is added to the contents of the M register. At this time, the M register 285a contains the corrected solution for θ as a first quadrant angle.

7. In step 7, the output 292 of the octant detector 286 (correct since step 3) and the contents of the M register 285a are applied to a control counter 293 which converts the angular data into digital form. The complement of this digital number is put into a binary counter 294. Simultaneously, the control counter 293 counts up from the initial complemented data number; when it reaches all 1's, it stops the binary counter 294. (The control counter, by counting up from the complemented data number, has the effect of being a true number down-counter.) At this point, the binary counter 294 holds an equivalent bearing angle in binary form. For example, if the angle were 15°, the binary counter 294 would hold 0001 0101. The binary count is then applied to a bearing display unit 295, which is a digital device designed to receive binary counts for each decimal digit place. The display would, with the given example, read 15.0°.

In conclusion therefore, the invention provides for the real-time recording and subsequent replaying of electrical signals for energizing search radar display units. The subject invention can record signals from a plurality of search radars simultaneously of either 2 or 3 dimensional capability.

Obviously many modifications and variations of the prevent invention are possible in light of the above teachings. It is therefore to be understood that within the scope of the appended claims, the invention may be practiced otherwise than as specifically desired.

We claim:

1. A radar data recording and reproducing system for recording radar data received from a plurality of tracking radars and subsequently replaying said radar data into a display system, said radar data including video signals, trigger synchronizing pulses, elevation angle signals, radar bearing information and time and auxiliary data, comprising:
    means for combining said video signals, trigger synchronizing pulses, and elevation angle signals into a composite video signal;
    means for converting said radar bearing and time and auxiliary information signals into a serially multiplexed digital signal;
    recording means adapted to severally record said composite video signal and said serially multiplexed digital signal simultaneously;
    first converting means operably connected to said recording means for reconverting said composite video signal into said video signals, trigger synchronizing pulses, and elevation angle signals; and
    second reconverting means operably connected to said recording means for reconverting said serially multiplexed digital signal into said radar bearing and time and auxiliary information signals.

2. The radar data recording and reproducing system as specified in claim 1 wherein said combining means comprises:
    means for conditioning said video signals, said trigger synchronizing pulses and said elevation angle signals into signals compatible with said recording means and said first reconverting means; and
    means for summing said conditioned signals producing thereby said composite video signal.

3. The radar data recording and reproducing system as defined in claim 2 wherein said conditioning means comprises:
    means for converting said elevation angle signal into an output digital signal;
    means for encoding said trigger synchronizing pulses; and
    means for modulating said video signal.

4. The radar data recording and reproducing system as recited in claim 3 wherein said first reconverting means comprises:
    means for separating said conditioned video, trigger and elevation signals from said composite video and including;
    means for detecting said modulated video signal;
    means for detecting said trigger synchronizing pulses;
    means for reconstructing the original timing relationship among said trigger synchronizing pulses; and
    means for converting said digital elevation signal into the originally received analog elevation signal.

5. The radar data recording and reproducing system as recited in claim 4 wherein said radar bearing signal may be present, at any given time, in the form of either an analog signal or a digital pulse train and wherein said serially, multiplexed digital system converting means comprises:
    means rendered effective when said radar bearing signal is in the form of a scalar or synchro analog signal for generating an analog signal representing the sine and cosine of radar bearing;
    means for converting said analog sine and cosine signal into a corresponding parallel digital signal;
    means rendered effective when said radar bearing signal is in the form of a digital pulse train for converting said digital pulse train into a corresponding parallel digital signal;
    means responsive to said trigger synchronizing pulses for converting said trigger synchronizing pulses into a corresponding parallel digital signal according to a predetermined timing format;
    serial formatting means capable of transforming an input parallel digital signal into a serially formatted digital signal according to a predetermined timing format; and
    OR gating means connecting the input of said serial formatting means selectively to the outputs of said analog sine and cosine converting means and said digital pulse train converting means.

6. The radar data recording and reproducing system as recited in claim 5 wherein said second reconverting means comprises:
    decoding means connected to the output of said recording means for converting said serially multiplexed digital signal into radar bearing information signals, trigger information signals and time information signals, all of said signals being in parallel binary form;
    analog converting means for converting said parallel digital radar bearing information into scalar and synchro analog signals,
    means for receiving said digital parallel binary information for converting said information into digital pulse trains representing sine and cosine functions of said radar bearing signal; and
    means for recovering said timing information.

7. The radar data recording and reproducing system as defined in claim 6 wherein said elevation angle converting means further comprises:
    means for sampling said analog elevation angle signal at each radar sweep, said sampling being controlled by said trigger synchronizing pulses; and
    means responsive to said output digital signal and to said sampled analog signal for producing an error signal therefrom, said error signal serving to periodically revise said output digital signal.

8. The radar data recording and reproducing system as specified in claim 6 and further comprising self-test circuit means operably connected to the output of said decoding means for instantaneously determining the angular value of said radar bearing angle.

9. The radar data recording and reproducing system as recited in claim 5 wherein said means for generating said sine and cosine equivalents of said scalar or synchro analog signal comprises:
    sine/cosine converter means for producing analog voltages proportional to the sine and cosine of said synchro or scalar analog signal input;
    first analog multiplexing means connected so as to receive the cosine equivalent outputs of said sine/cosine converter means; and second analog multiplexing means connected so as to receive the sine equivalent outputs of said sine/cosine converter means and the output of said first analog multiplexing means.

10. The radar data recording and reproducing system as specified in claim 9 wherein said parallel digital converting means comprises:

sample and hold circuit means for sampling a portion of said output of said second analog multiplexing means, said sample and hold circuit means holding the analog voltage level of said output signal of said second analog multiplexing means thereby presenting a constant voltage level for the duration of the multiplexed analog word; and first converting means for converting said multiplexed analog output of said sample and hold circuit means into an equivalent binary number and including;

comparator circuit means operably connected to said output of said sample and hold circuit means for comparing the output of said first converting means with said sample and hold circuit output signal;

control circuit means wherein said first converting means will initiate said digital conversion as long as said output level of said sample and hold circuit means differs from the output level of said first converting means, and second converting means for converting the binary output of said first converting means into a parallel binary signal.

11. The radar data recording and reproducing system recited in claim 10 wherein said digital pulse train is comprised of a pulse train representing the sine of said bearing angle, and a pulse train representing the cosine of said bearing angle wherein the number of pulses in each of said digital pulse trains represents the specific sine and cosine numerical value and further wherein said means for converting said digital pulse train comprises:

means for counting the number of pulses in each of said sine and cosine pulse trains, said counting means producing thereby a controlled, parallel binary signal output equivalent to said pulse number count;

control circuit means for controlling the readout of said counting means, said control circuit means being controlled by said trigger synchronizing pulses;

means for converting said controlled, parallel, binary signal output of said counting means into a digital, parallel signal; and timing means for strobing the output of said converting means into said formatting means, said strobing occuring in proper timing relationship with said trigger synchronizing pulses.

12. The radar data recording and reproducing system as specified in claim 11 wherein said analog converting means comprises:

digital-to-analog converting means receiving said digital parallel signal and converting said signal into scalar analog voltages corresponding to the sine and cosine of said bearing angle, said conversion occurring according to a predetermined timing format; and means for converting said digital parallel signal output into synchro analog signals.

13. The radar data recording and reproducing system as defined in claim 12 wherein said synchro analog voltage converter comprises:

means for modulating said sine and cosine signals;

said sine and cosine signals having an error therebetween;

means for producing a motor drive signal from said error signal;

motor means responding to said motor drive signal; and synchro transmitting means operably connected to said motor means for transmitting said synchro signal.

14. The radar data recording and reproducing system as recited in claim 13 wherein said digital converting means comprises:

means for determining from the pulses in said digital pulse train the digital value of said radar bearing signal, said determination being performed according to a predetermined timing format; and means for converting said determined digital value, said value representing the trigonometric value of said radar bearing data, into angular values of said radar bearing data.

15. A method of radar data recording and reproducing for recording radar data received from a plurality of tracking radars and subsequently replaying said radar data into a display system, said radar data including video signals, trigger synchronizing pulses, elevation angle signals, and radar bearing information, comprising the steps of:

combining said video signals trigger synchronizing pulses, and elevation angle signals into a composite video signal;

converting said radar bearing information into a serially multiplexed digital signal;

recording said composite video signal and said serially multiplexed digital signal;

reconverting said composite video signal into said video signal, trigger synchronizing pulses and elevation angle signals; and reconverting said serially multiplexed digital signal into said radar bearing information.

* * * * *